No. 771,104.

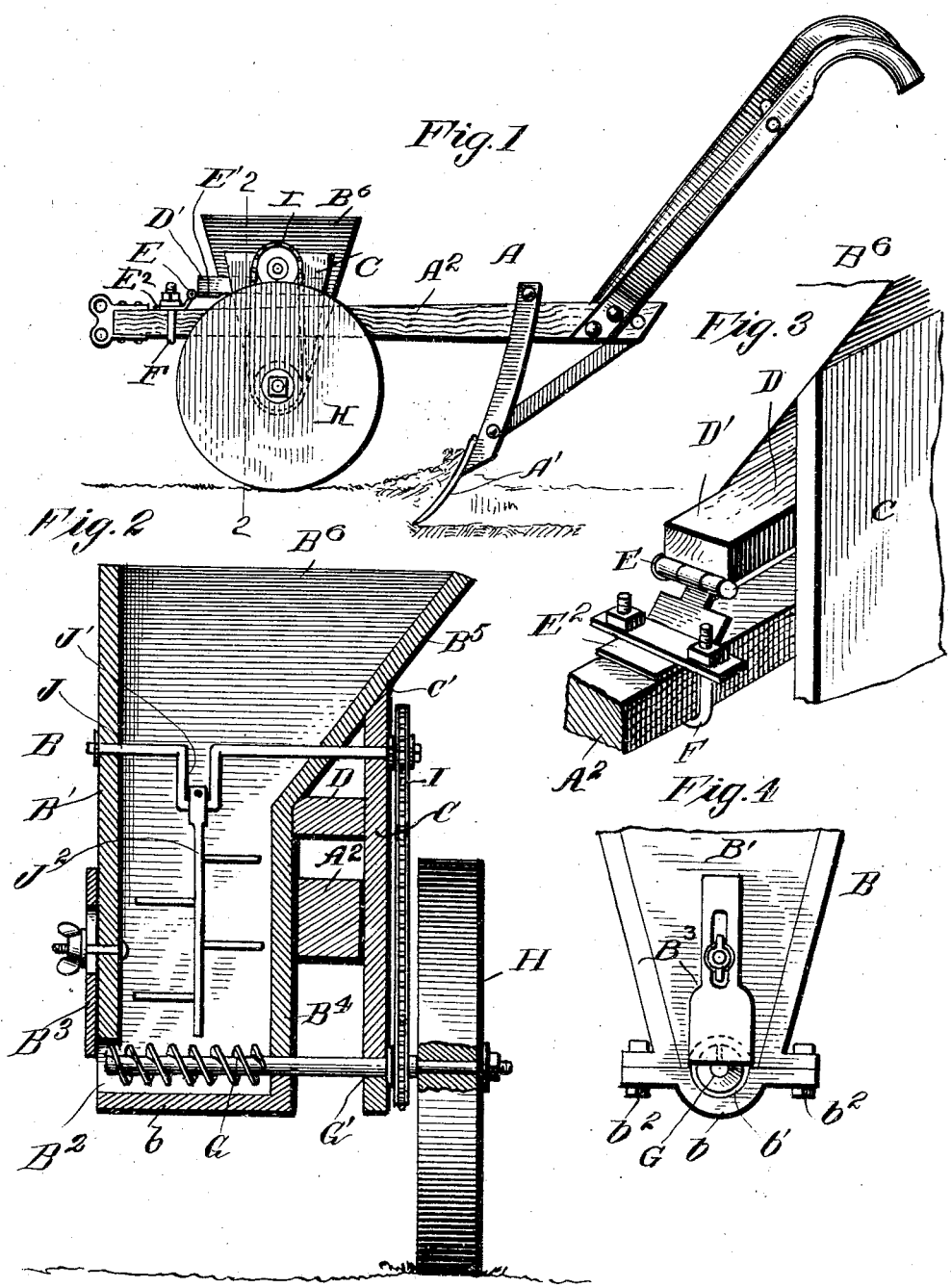

Patented September 27, 1904.

UNITED STATES PATENT OFFICE.

JOHN CLARENCE SPARKS, OF MECHANICSVILLE, SOUTH CAROLINA.

FERTILIZER-DISTRIBUTER.

SPECIFICATION forming part of Letters Patent No. 771,104, dated September 27, 1904.

Application filed May 24, 1904. Serial No. 209,575. (No model.)

*To all whom it may concern:*

Be it known that I, JOHN CLARENCE SPARKS, a citizen of the United States, and a resident of Mechanicsville, in the county of Lee and State of South Carolina, have made certain new and useful Improvements in Fertilizer-Distributers, of which the following is a specification.

My invention is an improvement in fertilizer-distributers, having for an object to provide a novel construction which can be applied to an ordinary plow-beam, can be set in any desired adjustment on said beam, and will efficiently serve the purpose for which it is designed; and the invention consists in certain novel constructions and combinations of parts, as will be hereinafter described and claimed.

In the drawings, Figure 1 is a side elevation of my fertilizer-distributer as in use. Fig. 2 is a vertical transverse section on about line 2 2 of Fig. 1. Fig. 3 is a detail perspective view illustrating the means for connecting the sill of the box with the beam of the plow, and Fig. 4 is a detail side elevation showing the valve for regulating the feed.

By my invention I provide means for delivering the fertilizer in advance of the plow-shovel, so the latter can turn the furrow over the fertilizer or seed which may have been deposited by the improved device, and to this end I arrange the fertilizer-distributing devices in advance of the shovel $A'$ of the plow A, whose beam $A^2$ supports the distributing devices and forms a base against which the sill of the distributing devices bumps in the operation of the invention, thus serving to agitate the contents of the box in the use of the invention, as will be presently described. The plow shovel and beam may be of ordinary construction, the invention being designed for universal application to the ordinary plows now in general use.

The distributer includes the box B, which is of a special construction, having at one side the upright side plate $B'$, provided at its lower end with a discharge-outlet $B^2$, which is controlled by the valve-plate $B^3$, which may be adjusted, as will be understood from Figs. 2 and 4, to vary the exposed portion of the discharge-opening $B^2$ and may be secured in any desired adjustment by the winged nut, as will be understood from Figs. 2 and 4. At the side opposite the plate $B'$ the box has the upright side board $B^4$ and at the upper end thereof the outwardly-inclined board $B^5$, which forms the hopper $B^6$ at the top of the box B. I also provide at this side of the box the depending side plate C, which is secured at its upper end at $C'$ to the inclined board $B^5$ and is separated below such point $C'$ from the box, so the beam $A^2$ of the plow may operate between the depending side plate C and the side $B^4$ of the box, the fertilizer-distributer thus straddling the beam and the latter operating below the sill D, as will be understood from Figs. 2 and 3. This sill D is an important feature of my invention, being secured rigidly to the box B and the depending side plate C and extending at its front end $D'$ forwardly and being hinged at such end to the beam, so the rear end of the sill D may rise and fall in the operation of the invention and may bump upon the beam $A^2$ in accommodating the distributer to any inequalities in the ground, such bumping operation also serving to agitate the contents of the box B and in some instances, where the ground is very rough, avoiding the necessity of separate agitating devices, which latter, however, I employ whenever necessary and will describe hereinafter. In hinging the sill D in connection with the beam $A^2$, I prefer to employ a hinge E, one leaf, $E'$, of which is secured to the under side of the sill D, at the front end of the latter, the other leaf, $E^2$, being deflected downwardly and forwardly and having its front wing lapped against the upper side of the beam $A^2$ and secured thereto by the clevis F, as best shown in Figs. 1 and 3 of the drawings. By this construction the sill D may be hinged in connection with the beam at any desired point in advance of the shovel $A'$, can be readily applied and removed, and can be easily shifted along the beam and secured in any desired position thereon.

For feeding the fertilizer, or seed if desired, out through the side opening $B^2$, I prefer to employ the screw conveyer G, whose shaft is journaled at $G'$ in the box and depending side plate and has the wheel H secured on its outer end, the said wheel being arranged to run upon the ground when the plow is in the ground, as shown in Fig. 1. This wheel H has a sprocket connected by a chain I with an agitator-shaft J, journaled in the box and having a crank portion J', from which is suspended an agitator J², the operation of which will be fully understood from Fig. 2 of the drawings. Where desired, I may provide the screw conveyer in different sizes in order to distribute different quantities of fertilizer per acre, and I make the bottom $b$ of the box B removable, the bottom $b$ having a curved seat $b'$ to coincide with the screw conveyer with which it is used and bolts $b^2$ being provided for securing the bottoms detachably in place.

The construction is simple, easily operated, and efficiently serves the purpose for which it is designed.

While the invention is especially designed for use as a fertilizer-distributer, it will be understood that it will also be found useful in planting peas, oats, wheat, barley, rice, and other seed it is desired to sow in rows.

Having thus described my invention, what I claim as new, and desire to secure by Letters Patent, is—

1. The improved fertilizer-distributer herein described, consisting of the box having at one side a side board provided at its lower end with a discharge-opening and with means for regulating the same, and at its other side with an upright side board at its lower portion, and an outwardly-inclined side board at the upper end of the upright side board, and a depending side plate extending below the inclined side board and spaced apart from the box to straddle a plow-beam, a sill secured between said depending side plate and the box adjacent to the upper end of the side plate, and extending at its front end forwardly in advance of the box, a hinge having one strap secured to the front end of the said sill and its other strap deflected downwardly and forwardly to lap against the plow-beam, a clip for securing such strap to the plow-beam, a screw conveyer operating in the box, and having its shaft journaled in the box and in the depending side plate, a wheel on said shaft and arranged to bear upon the ground, a shaft operating in the box and gearing between the conveyer and the shaft, substantially as and for the purpose set forth.

2. A fertilizer-distributer, comprising the box, the depending side plate spaced away from the box to straddle a beam, and a sill between said plate and box and extending forwardly, and a hinge connected with the front end of the sill and adapted for connection with the plow-beam, and means for delivering the material from the box, substantially as set forth.

3. In a fertilizer-distributer, the combination of the box, a side plate spaced away from the box to straddle a beam, a sill secured between said plate and the box, and means at the front end of the said sill for effecting a hinge connection between the same and the plow-beam, substantially as set forth.

4. The combination in a distributer, substantially as described of the box, having an outwardly-inclined board at its upper end, a side plate depending below said inclined board, and spaced away from said box, and a sill between the side plate and the box, and devices for effecting a hinge connection between the said sill and the beam, substantially as set forth.

5. The combination of a plow-beam, the box, the depending side plate spaced away from the box to straddle a beam, the screw conveyer having its shaft crossing the space between the box and the depending side plate below the plow-beam, the sill between said plate and box above the plow-beam, and devices for effecting a hinge connection between the front end of the said sill and the plow-beam, substantially as set forth.

6. The combination in a fertilizer-distributer of the box having at one side an outwardly-inclined side board at its upper end and an upright depending side board extending below the side board and spaced apart from the body of the box to straddle the plow-beam, and a sill secured between said depending side plate and the body of the box adjacent to the upper end of the side plate whereby the said sill will overlie a plow-beam and be arranged to bump thereon in the operation of the distributer, such beam being extended forwardly, and a hinge for connecting the front end of the sill with a plow-beam, substantially as set forth.

JOHN CLARENCE SPARKS.

Witnesses:
SAML. SPARKS,
H. T. EDENS.